United States Patent
Gemici et al.

(10) Patent No.: US 10,036,833 B2
(45) Date of Patent: Jul. 31, 2018

(54) SUPERHYDROPHILIC COATINGS

(75) Inventors: Zekeriyya Gemici, Istanbul (TR); Michael F. Rubner, Westford, MA (US); Robert E. Cohen, Jamaica Plain, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 12/956,913

(22) Filed: Nov. 30, 2010

(65) Prior Publication Data
US 2011/0073003 A1 Mar. 31, 2011

Related U.S. Application Data

(62) Division of application No. 11/463,500, filed on Aug. 9, 2006, now Pat. No. 7,842,352.

(51) Int. Cl.
| | |
|---|---|
| *B32B 9/00* | (2006.01) |
| *G02B 1/118* | (2015.01) |
| *G02B 1/18* | (2015.01) |
| *B82Y 20/00* | (2011.01) |
| *B82Y 30/00* | (2011.01) |
| *C03C 17/00* | (2006.01) |
| *C03C 17/34* | (2006.01) |
| *C09D 1/00* | (2006.01) |
| *C09D 5/00* | (2006.01) |
| *G02B 27/00* | (2006.01) |

(52) U.S. Cl.
CPC .............. *G02B 1/118* (2013.01); *B82Y 20/00* (2013.01); *B82Y 30/00* (2013.01); *C03C 17/006* (2013.01); *C03C 17/3411* (2013.01); *C09D 1/00* (2013.01); *C09D 5/00* (2013.01); *G02B 1/18* (2015.01); *G02B 27/0006* (2013.01); *C03C 2217/42* (2013.01); *C03C 2217/734* (2013.01); *C03C 2217/75* (2013.01); *C03C 2218/11* (2013.01); *G02B 2207/101* (2013.01); *G02B 2207/107* (2013.01)

(58) Field of Classification Search
None
See application file for complete search history.

(56) References Cited

U.S. PATENT DOCUMENTS

| | | |
|---|---|---|
| 2,728,740 A | 12/1955 | Iler |
| 2,739,075 A | 3/1956 | Iler |
| 2,914,486 A | 11/1959 | Schwartz |

(Continued)

FOREIGN PATENT DOCUMENTS

| | | |
|---|---|---|
| EP | 0 137 289 | 4/1985 |
| WO | WO 2007/056427 | 5/2007 |

OTHER PUBLICATIONS

Overview—LDPE, Kipp, Dale O., (2004; 2010) Plastic Material Data Sheets, MatWeb LLC.*

(Continued)

*Primary Examiner* — Daniel J. Schleis
(74) *Attorney, Agent, or Firm* — Steptoe & Johnson LLP

(57) ABSTRACT

A superhydrophilic coating on a substrate can be antireflective and antifogging. The coating can remain antireflective and antifogging for extended periods. The coating can include oppositely charge inorganic nanoparticles, and can be substantially free of an organic polymer. The coating can be made mechanically robust by a hydrothermal calcination.

3 Claims, 12 Drawing Sheets

(56) References Cited

U.S. PATENT DOCUMENTS

| | | | |
|---|---|---|---|
| 3,485,658 A * | 12/1969 | Iler | 428/328 |
| 5,254,904 A | 10/1993 | Van De Leest et al. | |
| 5,821,186 A | 10/1998 | Collins | |
| 6,479,146 B1 | 11/2002 | Caruso et al. | |
| 6,833,192 B1 | 12/2004 | Caruso et al. | |
| 2003/0215626 A1 | 11/2003 | Hiller et al. | |
| 2005/0221098 A1* | 10/2005 | Azzopardi et al. | 428/446 |
| 2006/0029808 A1 | 2/2006 | Zhai et al. | |
| 2007/0104922 A1* | 5/2007 | Zhai et al. | 428/141 |

OTHER PUBLICATIONS

Overview—HDPE, Kipp, Dale O., (2004; 2010) Plastic Material Data Sheets, MatWeb LLC.*
Ahn, J. S.; Hammond, P. T.; Rubner, M. F.; Lee, I. *Colloids and Surfaces A: Physicochem. Eng. Aspects* 2005, 259, 45.
Alivisatos, A. P. *Science* 1996, 271, 933-937.
Barthlott, W.; Neinhuis, C. *Planta* 1997, 202, 1.
Bico, J. et al., *Europhys. Lett.* 2001, 55, 214-220.
Bico, J.; et al. *Europhysics Letters* 1999, 47, (2), 220-226.
Bico, J.; et al. *Europhysics Letters* 1999, 47, (6), 743-744.
Biswas, R.; et al., *Phys. Rev. B* 2000, 61, 4549-4553.
Bogdanvic, G.; et al. *J. Colloids Interface Science* 2002, 255, 44.
Brust, M.; Bethell, D.; Kiely, C. J.; Schiffrin, D. J. *Langmuir* 1998, 14, 5425-5429.
Cassie, A. B. D.; Baxter, S. *Trans. Faraday Soc.* 1944, 40, 546.
Cebeci, F. C.; Wu, Z. Z.; Zhai, L.; Cohen, R. E.; Rubner, M. F. *Langmuir* 2006, 22, 2856-2862.
Chen, W.; et al. *Langmuir* 1999, 15, 3395.
Fery et al., *Langmuir* 2001, 17, 3779.
G. Decher, *Science* 1997, 277, 1232.
Gao, Y. F.; et al. *Langmuir* 2004, 20, (8), 3188-3194.
Garcia-Santamaria, F.; et al. *Langmuir* 2002, 18, 1942-1944.
Gu, Z. Z.; Fujishima, A.; Sato, O. *Angewandte Chemie-International Edition* 2002, 41, (12), 2068-2070.
Hattori, H. *Adv. Mater.* 2001, 13, 51.
Henglein, A. *Chem. Rev.* 1989, 89, 1861-1873.
Iler, R. K. *J. Colloid Interf. Sci.* 1966, 21, 569-594.
Jeon, J.; Panchagnula, V.; Pan, J.; Dobrynin, A. V. *Langmuir* 2006, 22, 4629-4637.
Klar, T.; et al., *Phys. Rev. Lett.* 1998, 80, 4249-4252.
Kommireddy, D. S.; et al. *J. Nanosci. Nanotechnol.* 2005, 5, 1081.
Koo, H. Y.; et al. *Adv. Mater.* 2004, 16, 274.
Lvov, Y.; Ariga, K.; Onda, M.; Ichinose, I.; Kunitake, T. *Langmuir* 1997, 13, 6195-6203.
Machida, M., et al., *J. Mater. Sci.* 1999, 34, 2569-2574.
McHale, G.; Shirtcliffe, N. J.; Aqil, S.; Perry, C. C.; Newton, M. I. *Physical Review Letters* 2004, 93, (3).
Mendelsohn et al., *Langmuir* 2000, 16, 5017.
Nakajima, A.; et al., *Langmuir* 2000, 16, 7044-7047.
Neinhuis, C.; Barthlott, W. *Ann. Bot.* 1997, 79, 677.
Oner, D.; McCarthy, T. J. *Langmuir* 2000, 16, 7777.
Ostrander, J. W., Mamedov, A. A., Kotov, N. A., *J. Am. Chem. Soc.* 2001, 123, 1101-1110.
Rouse, J. H.; Ferguson, G. S. *J. Am. Chem. Soc.* 2003, 125, 15529.
Sennerfors, T.; et al. *Langmuir* 2002, 18, 6410.
Shiratori et al., *Macromolecules* 2000, 33, 4213.
Sun, T. L.; et al. *Angewandte Chemie-International Edition* 2004, 43, (3), 357-360.
Taton, T. A.; Mucic, R. C.; Mirkin, C. A.; Letsinger, R. L. *J. Am. Chem. Soc.* 2000, 122, 6305-6306.
Tzitzinou, A.; et al., *Macromolecules* 2000, 33, 2695-2708.
Wang, R.; et al., *Nature* 1997, 388, (6641), 431-432.
Wang, X. R.; et al., *Appl. Phys. Lett.* 1998, 72, 3264-3266.
Wenzel, R. N. *Ind. Eng. Chem.* 1936, 28, 988.
Wenzel, R. N. *J. Phys. Colloid Chem.* 1949, 53, 1466.
Zhang, X. T.; et al., *Chem. Mater.* 2005, 17, 696-700.
Zhang, X-T et al., "Self-Cleaning Particle Coating with Antireflection Properties," *Chemistry of Materials*, American Chemical Society, vol. 17, No. 3, Jan. 14, 2005, pp. 636-700, XP008101432.

* cited by examiner

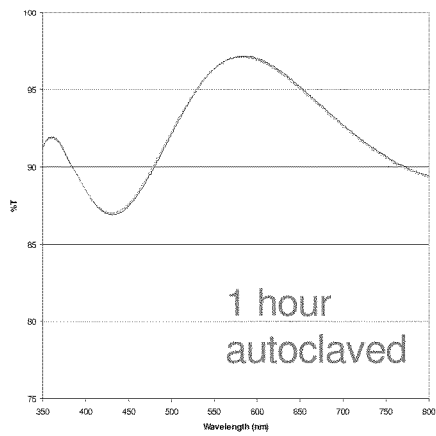
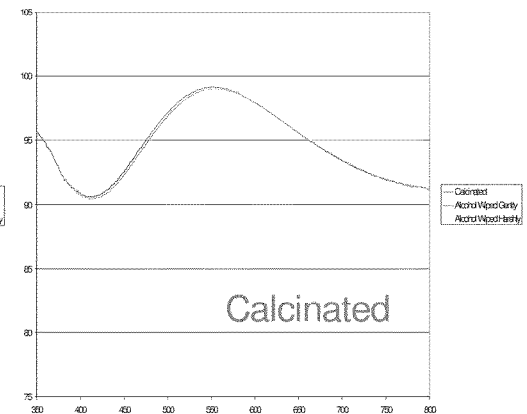
FIG. 9A  FIG. 9B
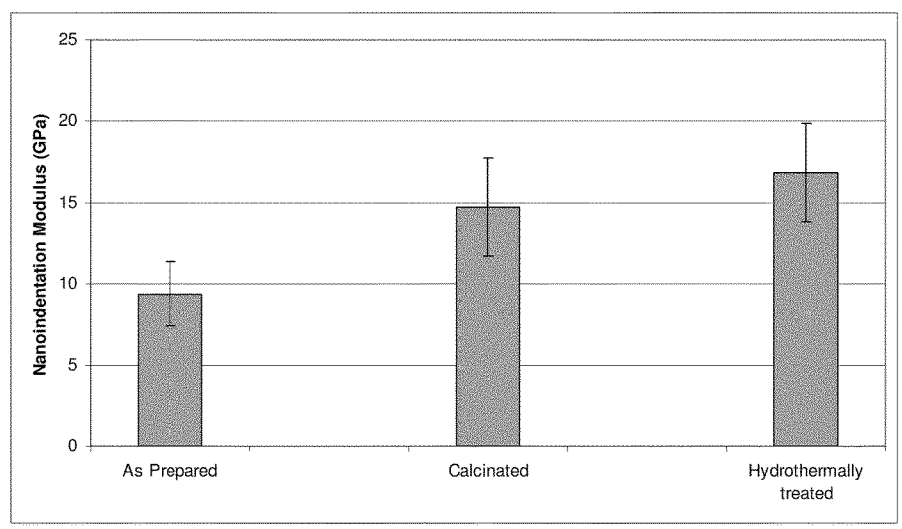
FIG. 10

SUPERHYDROPHILIC COATINGS

CLAIM OF PRIORITY

This application is a divisional application of U.S. application Ser. No. 11/463,500, now U.S. Pat. No. 7,842,352, filed Aug. 9, 2006, which is incorporated by reference in its entirety.

FEDERALLY SPONSORED RESEARCH OR DEVELOPMENT

This invention was made with government support under Grant No. DMR0213282 awarded by the National Science Foundation. The government has certain rights in this invention.

TECHNICAL FIELD

This invention relates to superhydrophilic coatings.

BACKGROUND

Transparent surfaces become fogged when tiny water droplets condense on the surface, where they scatter light and often render the surface translucent. Fogging frequently occurs when a cold surface suddenly comes in contact with warm, moist air. Fogging severity can ultimately compromise the usefulness of the transparent material. In some cases, fogging can be a dangerous condition, for example when the fogged material is a vehicle windscreen or goggle lens. Current commodity anti-fog coatings often lose effectiveness after repeated cleanings over time, and therefore require constant reapplication to ensure their effectiveness.

SUMMARY

Stable superhydrophilic coatings can be formed from layer-by-layer assembled films including nanoparticles, polyelectrolytes, or a combination of these. The superhydrophilic coatings can be antifogging, antireflective, or both anti-fogging and anti-reflective. The coatings can have high transparency, high anti-fog efficiency, long environmental stability, high scratch and abrasion resistance, and high mechanical integrity. Preferably, a single coatings has a combination of these properties. The coating can be applied to a large area substrate using industry scale technology, leading to low fabrication cost.

The coatings can be used in any setting where the condensation of water droplets on a surface is undesired, particularly where the surface is a transparent surface. Examples of such settings include sport goggles, auto windshields, windows in public transit vehicles, windows in armored cars for law enforcement and VIP protection, solar panels, and green-house enclosures; Sun-Wind-Dust goggles, laser safety eye protective spectacles, chemical/biological protective face masks, ballistic shields for explosive ordnance disposal personnel, and vision blocks for light tactical vehicles.

In one aspect, a method of treating a surface includes depositing a first plurality of inorganic nanoparticles having a first electrostatic charge on a substrate, depositing an oppositely charged polyelectrolyte over the first plurality of inorganic nanoparticles, and contacting the first plurality of inorganic nanoparticles and the oppositely charged polyelectrolyte with a calcination reagent at a calcination temperature. The oppositely charged polyelectrolyte can include a second plurality of inorganic nanoparticles. The first plurality of inorganic nanoparticles can have a different average particle size than the second plurality of inorganic nanoparticles. The first plurality of inorganic nanoparticles can include a plurality of silicon dioxide nanoparticles. The second plurality of inorganic nanoparticles can include a plurality of titanium dioxide nanoparticles.

The calcination temperature can be less than 500° C., less than 200° C., or less than 150° C. The calcination reagent can be water. Contacting the first plurality of inorganic nanoparticles and the oppositely charged polyelectrolyte with a calcination reagent at a calcination temperature can include contacting at a calcination pressure. The calcination pressure can be in the range of 10 psi to 30 psi.

The method can include repeating the steps of depositing a first plurality of inorganic nanoparticles having a first electrostatic charge on a substrate and depositing an oppositely charged polyelectrolyte over the first plurality of inorganic nanoparticles; thereby forming an electrostatic multilayer. The electrostatic multilayer can be substantially free of an organic polymer.

In another aspect, an article includes a surface treated by the method of claim 1.

In another aspect, a superhydrophilic surface includes a plurality of hydrothermally calcinated inorganic nanoparticles arranged on a substrate. The surface can have a nanoindentation modulus of greater than 15 GPa.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 9A-B are graphs illustrating optical properties of coated glass.

FIG. 10 is a graph illustrating mechanical properties of superhydrophilic coatings.

DETAILED DESCRIPTION

Figure 1:
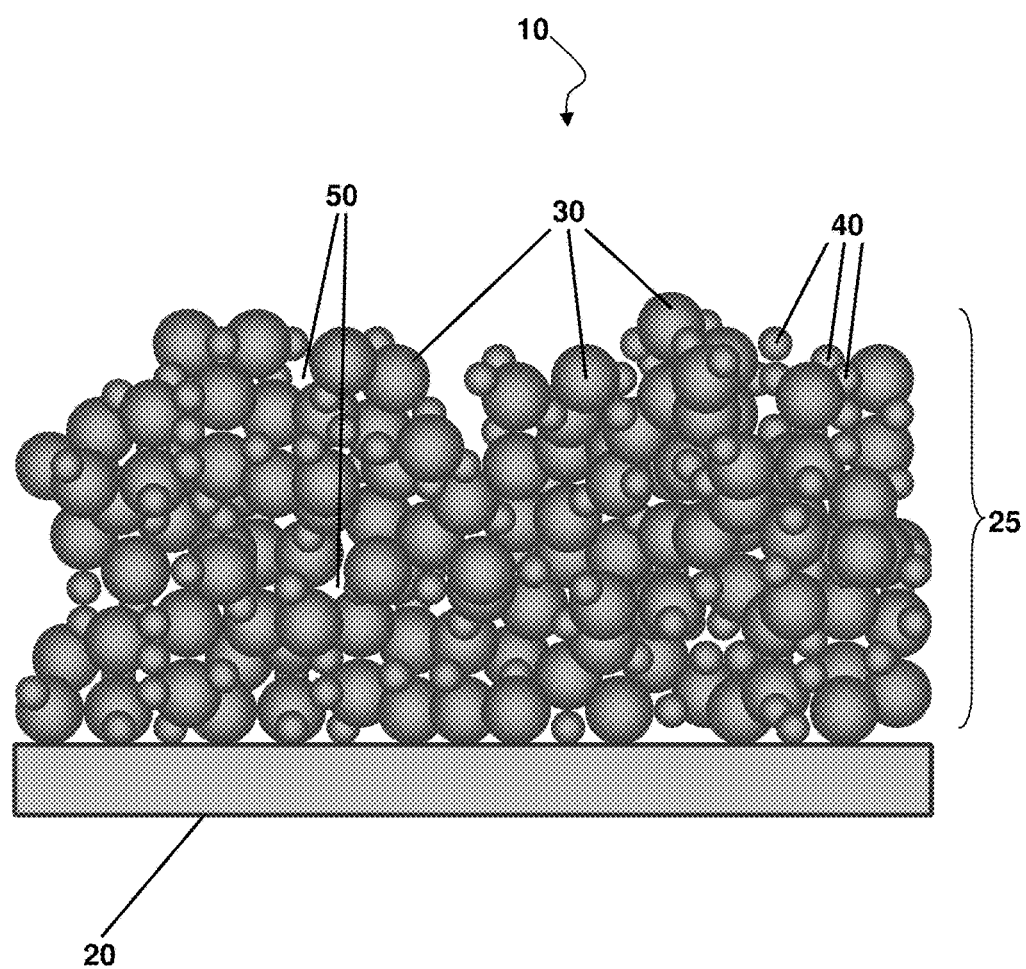
FIG. 1 is a schematic depiction of a superhydrophilic coating.

Surfaces having a nanotexture can exhibit extreme wetting properties. A nanotexture refers to surface features, such as ridges, valleys, or pores, having nanometer (i.e., typically less than 1 micrometer) dimensions. In some cases, the features will have an average or rms dimension on the nanometer scale, even though some individual features may exceed 1 micrometer in size. The nanotexture can be a 3D network of interconnected pores. Depending on the structure and chemical composition of a surface, the surface can be hydrophilic, hydrophobic, or at the extremes, superhydrophilic or superhydrophobic. One method to create the desired texture is with a polyelectrolyte multilayer. Polyelectrolyte multilayers can also confer desirable optical properties to surfaces, such as anti-fogging, anti-reflectivity, or reflectivity in a desired range of wavelengths. See, for example, U.S. Patent Application Publication Nos. 2003/0215626, and 2006/0029634, and U.S. patent application Ser. No. 11/268,547, each of which is incorporated by reference in its entirety.

Hydrophilic surfaces attract water; hydrophobic surfaces repel water. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water droplets travel across a surface having low contact angle hysteresis more readily than across a surface having a high contact angle hysteresis.

A surface can be superhydrophilic. A superhydrophilic surface is completely and instantaneously wet by water, i.e., exhibiting water droplet advancing contact angles of less than 5 degrees within 0.5 seconds or less upon contact with water. See, for example, Bico, J. et al., *Europhys. Lett.* 2001, 55, 214-220, which is incorporated by reference in its entirety. At the other extreme, a surface can be superhydrophobic, i.e. exhibiting a water droplet advancing contact angles of 150° or higher. The lotus leaf is an example of a superhydrophobic surface (See Neinhuis, C.; Barthlott, W. *Ann. Bot.* 1997, 79, 677; and Barthlott, W.; Neinhuis, C. *Planta* 1997, 202, 1, each of which is incorporated by reference in its entirety). The lotus leaf also exhibits very low contact angle hysteresis: the receding contact angle is within 5° of the advancing contact angle (See, for example, Chen, W.; et al. *Langmuir* 1999, 15, 3395; and Oner, D.; McCarthy, T. J. *Langmuir* 2000, 16, 7777, each of which is incorporated by reference in its entirety).

Photochemically active materials such as $TiO_2$ can become superhydrophilic after exposure to UV radiation; or, if treated with suitable chemical modifications, visible radiation. Surface coatings based on $TiO_2$ typically lose their superhydrophilic qualities within minutes to hours when placed in a dark environment, although much progress has been made towards eliminating this potential limitation. See, for example, Gu, Z. Z.; Fujishima, A.; Sato, O. *Angewandte Chemie-International Edition* 2002, 41, (12), 2068-2070; and Wang, R.; et al., *Nature* 1997, 388, (6641), 431-432; each of which is incorporated by reference in its entirety.

Textured surfaces can promote superhydrophilic behavior. Early theoretical work by Wenzel and Cassie-Baxter and more recent studies by Quéré and coworkers suggest that it is possible to significantly enhance the wetting of a surface with water by introducing roughness at the right length scale. See, for example, Wenzel, R. N. *J. Phys. Colloid Chem.* 1949, 53, 1466; Wenzel, R. N. *Ind. Eng. Chem.* 1936, 28, 988; Cassie, A. B. D.; Baxter, S. *Trans. Faraday Soc.* 1944, 40, 546; Bico, J.; et al., D. *Europhysics Letters* 2001, 55, (2), 214-220; and Bico, J.; et al. *Europhysics Letters* 1999, 47, (6), 743-744, each of which is incorporated by reference in its entirety. Building on this work, it has recently been demonstrated that both lithographically textured surfaces and microporous surfaces can be rendered superhydrophilic. See, e.g., McHale, G.; Shirtcliffe, N. J.; Aqil, S.; Perry, C. C.; Newton, M. I. *Physical Review Letters* 2004, 93, (3), which is incorporated by reference in its entirety. The intriguing possibility of switching between a superhydrophobic and superhydrophilic state has also been demonstrated with some of these surface structures. See, for example, Sun, T. L.; et al. *Angewandte Chemie-International Edition* 2004, 43, (3), 357-360; and Gao, Y. F.; et al. *Langmuir* 2004, 20, (8), 3188-3194, each of which is incorporated by reference in its entirety.

Layer-by-layer processing of polyelectrolyte multilayers can be used to make conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. One method of depositing the polyelectrolytes is to contact the substrate with an aqueous solution of polyelectrolyte at an appropriate pH. The pH can be chosen such that the polyelectrolyte is partially or weakly charged. The multilayer can be described by the number of bilayers it includes, a bilayer resulting from the sequential application of oppositely charged polyelectrolytes.

In general, a polyelectrolyte is a material bearing more than a single electrostatic charge. The polyelectrolyte can be positively or negatively charged (i.e., polycationic or polyanionic, respectively). In some embodiments, a polyelectrolyte can bear both positive and negative charges (i.e., polyzwitterionic, such as a copolymer of cationic and anionic monomers). A polyelectrolyte can be an organic polymer including a backbone and a plurality of charged functional groups attached to the backbone. Examples of organic polymer polyelectrolytes include sulfonated polystyrene (SPS), polyacrylic acid (PAA), poly(allylamine hydrochloride), and salts thereof. The polyelectrolyte can be an inorganic material, such as an inorganic nanoparticle. Examples of polyelectrolyte inorganic nanoparticles include nanoparticles of $SiO_2$, $TiO_2$, and mixtures thereof. Some polyelectrolytes can become more or less charged depending on conditions, such as temperature or pH. Oppositely charge polyelectrolytes can be attracted to one another by virtue of electrostatic forces. This effect can be used to advantage in layer-by-layer processing.

Layer-by-layer methods can provide a new level of molecular control over the deposition process by simply adjusting the pH of the processing solutions. A nonporous polyelectrolyte multilayer can form porous thin film structures induced by a simple acidic, aqueous process. Tuning of this pore forming process, for example, by the manipulation of such parameters as salt content (ionic strength), temperature, or surfactant chemistry, can lead to the creation of micropores, nanopores, or a combination thereof. A nanopore has a diameter of less than 150 nm, for example, between 1 and 120 nm or between 10 and 100 nm. A nanopore can have diameter of less than 100 nm. A micropore has a diameter of greater than 150 nm, typically greater than 200 nm. Selection of pore forming conditions can provide control over the porosity of the coating. For example, the coating can be a nanoporous coating, substantially free of micropores. Alternatively, the coating can be a microporous coating having an average pore diameters of greater than 200 nm, such as 250 nm, 500 nm, 1 micron, 2 microns, 5 microns, 10 microns, or larger.

The properties of weakly charged polyelectrolytes can be precisely controlled by changes in pH. See, for example, G.

Decher, *Science* 1997, 277, 1232; Mendelsohn et al., *Langmuir* 2000, 16, 5017; Fery et al., *Langmuir* 2001, 17, 3779; Shiratori et al., *Macromolecules* 2000, 33, 4213; and U.S. Patent Application Publication No. 2003-0215626, each of which is incorporated by reference in its entirety. A coating of this type can be applied to any surface amenable to the water based layer-by-layer (LbL) adsorption process used to construct these polyelectrolyte multilayers. Because the water based process can deposit polyelectrolytes wherever the aqueous solution contacts a surface, even the inside surfaces of objects having a complex topology can be coated. In general, a polyelectrolyte can be applied to a surface by any method amenable to applying an aqueous solution to a surface, such as immersion, spraying, printing (e.g., ink jet printing), or mist deposition.

In 1966, Iler reported that multilayers of oppositely charged nanoparticles can be assembled by the sequential adsorption of oppositely charged nanoparticles onto substrates from aqueous suspensions (Iler, R. K. *J. Colloid Interf. Sci.* 1966, 21, 569-594, which is incorporated by reference in its entirety).

Surfaces with extreme wetting behavior can be fabricated from a polyelectrolyte coating. See, for example, U.S. Patent Application Publication No. 2006/0029808, which is incorporated by reference in its entirety. A polyelectrolyte can have a backbone with a plurality of charged functional groups attached to the backbone. A polyelectrolyte can be polycationic or polyanionic. A polycation has a backbone with a plurality of positively charged functional groups attached to the backbone, for example poly(allylamine hydrochloride). A polyanion has a backbone with a plurality of negatively charged functional groups attached to the backbone, such as sulfonated polystyrene (SPS) or poly (acrylic acid), or a salt thereof. Some polyelectrolytes can lose their charge (i.e., become electrically neutral) depending on conditions such as pH. Some polyelectrolytes, such as copolymers, can include both polycationic segments and polyanionic segments.

Multilayer thin films containing nanoparticles of $SiO_2$ can be prepared via layer-by-layer assembly (see Lvov, Y.; Ariga, K.; Onda, M.; Ichinose, I.; Kunitake, T. *Langmuir* 1997, 13, (23), 6195-6203, which is incorporated by reference in its entirety). Other studies describe multilayer assembly of $TiO_2$ nanoparticles, $SiO_2$ sol particles and single or double layer nanoparticle-based anti-reflection coatings. See, for example, Zhang, X-T.; et al. *Chem. Mater.* 2005, 17, 696; Rouse, J. H.; Ferguson, G. S. *J. Am. Chem. Soc.* 2003, 125, 15529; Sennerfors, T.; et al. *Langmuir* 2002, 18, 6410; Bogdanvic, G.; et al. *J. Colloids Interface Science* 2002, 255, 44; Hattori, H. *Adv. Mater.* 2001, 13, 51; Koo, H. Y.; et al. *Adv. Mater.* 2004, 16, 274; and Ahn, J. S.; Hammond, P. T.; Rubner, M. F.; Lee, I. *Colloids and Surfaces A: Physicochem. Eng. Aspects* 2005, 259, 45, each of which is incorporated by reference in its entirety. Incorporation of $TiO_2$ nanoparticles into a multilayer thin film can improve the stability of the superhydrophilic state induced by light activation. See, e.g., Kommireddy, D. S.; et al. *J. Nanosci. Nanotechnol.* 2005, 5, 1081, which is incorporated by reference in its entirety.

Layer-by-layer processing can be used to apply a high-efficiency conformal antireflective coating to virtually any surface of arbitrary shape, size, or material. See, for example, U.S. Patent Application Publication No. 2003/0215626, which is incorporated by reference in entirety. The process can be used to apply the antireflective coating to more than one surface at a time and can produce coatings that are substantially free of pinholes and defects, which can degrade coating performance. The porous coating can be antireflective. The process can be used to form antireflective and antiglare coatings on polymeric substrates. The simple and highly versatile process can create molecular-level engineered conformal thin films that function as low-cost, high-performance antireflection and antiglare coatings. The process can be used to produce high-performance polymeric optical components, including flat panel displays and solar cells.

Similarly, the coating can be an antifogging coating. The antifogging coating can prevent condensation of light-scattering water droplets on a surface. By preventing the formation of light-scattering water droplets on the surface, the coating can help maintain optical clarity of a transparent surface, e.g., a window or display screen. The coating can be both antireflective and antifogging. A surface of a transparent object having the antifogging coating maintains its transparency to visible light when compared to the same object without the antifogging coating under conditions that cause water condensation on the surface. Advantageously, a porous material can be simultaneously antifogging and antireflective. For example, a porous material can promote infiltration of water droplets into pores (to prevent fogging); and the pores can also reduce the refractive index of the coating, so that it acts as an antireflective coating.

A superhydrophilic coating can be made by depositing a polyelectrolyte multilayer film on a substrate and treating the multilayer to induce a porosity transition. The porosity transition can give rise to nanoscale porosity in the multilayer. Nanoparticles can be applied to further augment the texture of the surface. The resulting surface can be superhydrophilic.

A superhydrophilic surface can include a polyelectrolyte multilayer. A surface can be coated with the multilayer using a layer-by-layer method. Treatment of the multilayer can induce the formation of roughness in the multilayer. The multilayer can become a high roughness multilayer. High roughness can be micrometer scale roughness. The high roughness surface can have an rms roughness of 100 nm, 150 nm, 200 nm, or greater. Treatments that induce the formation of high roughness can include an acid treatment or a salt treatment (i.e., treatment with an aqueous solution of a salt). Formation of pores in the polyelectrolyte multilayer can lead to the development of high roughness in the multilayer. Appropriate selection of conditions (e.g., pH, temperature, processing time) can promote formation of pores of different sizes. The pores can be micropores (e.g., pores with diameters at the micrometer scale, such as greater than 200 nm, greater than 500 nm, greater than 1 micrometer, or 10 micrometers or later). A microporous polyelectrolyte multilayer can be a high roughness polyelectrolyte multilayer.

A high roughness polyelectrolyte multilayer can be formed by forming the polyelectrolyte multilayer over a high roughness surface. When the polyelectrolyte multilayer is formed over a high roughness surface, a treatment to increase the polyelectrolyte multilayer of the polyelectrolyte multilayer can be optional. The high roughness surface can include, for example: particles, such as microparticles or microspheres; nanoparticles or nanospheres; or an area of elevations, ridges or depressions. The micrometer scale particles can be, for example, particles of a clay or other particulate material. Elevations, ridges or depressions can be formed, for example, by etching, depositing micrometer scale particles, or photolithography on a suitable substrate.

A lock-in step can prevent further changes in the structure of the porous multilayer. The lock-in can be achieved by, for example, exposure of the multilayer to chemical or thermal polymerization conditions. The polyelectrolytes can become cross-linked and unable to undergo further transitions in porosity. In some cases, chemical crosslinking step can include treatment of a polyelectrolyte multilayer with a carbodiimide reagent. The carbodiimide can promote the formation of crosslinks between carboxylate and amine groups of the polyelectrolytes. A chemical crosslinking step can be preferred when the polyelectrolyte multilayer is formed on a substrate that is unstable at temperatures required for crosslinking (such as, for example, when the substrate is polystyrene). The crosslinking step can be a photocrosslinking step. The photocrosslinking can use a sensitizer (e.g., a light-sensitive group) and exposure to light (such as UV, visible or IR light) to achieve crosslinking. Masks can be used to form a pattern of crosslinked and non-crosslinked regions on a surface. Other methods for cros slinking polymer chains of the polyelectrolyte multilayer are known.

Nanoparticles can be applied to the multilayer, to provide a nanometer-scale texture or roughness to the surface. The nanoparticles can be nanospheres such as, for example, silica nanospheres, titania nanospheres, polymer nanospheres (such as polystyrene nanospheres), or metallic nanospheres. The nanoparticles can be metallic nanoparticles, such as gold or silver nanoparticles. The nanoparticles can have diameters of, for example, between 1 and 1000 nanometers, between 10 and 500 nanometers, between 20 and 100 nanometers, or between 1 and 100 nanometers. The intrinsically high wettability of silica nanoparticles and the rough and porous nature of the multilayer surface establish favorable conditions for extreme wetting behavior.

Superhydrophilic coatings can be created from multilayers without the need for treating the multilayer to induce a porosity transition. For example, the multilayer can include a polyelectrolyte and a plurality of hydrophilic nanoparticles. By choosing appropriate assembly conditions, a 3D nanoporous network of controllable thickness can be created with the nanoparticles. The network can be interconnected—in other words, the nanopores can form a plurality of connected voids. Rapid infiltration (nano-wicking) of water into this network can drive the superhydrophilic behavior.

The coating can be substantially free of organic polymers. For example, the coating can include oppositely charged inorganic nanoparticles, e.g., $SiO_2$ nanoparticles and $TiO_2$ nanoparticles.

Mechanical integrity (e.g., durability and adhesion) of a coating can be important in practical applications. As-assembled (i.e., prior to a lock-in treatment) $TiO_2/SiO_2$ nanoparticle-based multilayers can have less than ideal mechanical properties. The poor adhesion and durability of the as-assembled multilayer films is likely due to the absence of interpenetrating components (i.e., charged macromolecules) that bridge the deposited materials together within the coatings. The mechanical properties of the coatings can be drastically improved by calcinating the as-assembled multilayers at a high temperature (e.g., 550° C.) for 3 hours which leads to the fusing of the nanoparticles together and also better adhesion of the coatings to glass substrates. See, e.g., U.S. patent application Ser. No. 11/268,574, filed Nov. 8, 2005, which is incorporated by reference in its entirety.

A similar calcination effect can be achieved at lower temperature (e.g., less than 500° C., less than 250° C., less than 150° C., less than 125° C., or 100° C. or less) when the calcination is performed in the presence of a suitable calcination reagent. The calcination reagent can promote reaction between polyelectrolytes. For example the calcination reagent can be selected to facilitate a hydrolysis reaction; water is one such calcination reagent. When the coating includes inorganic nanoparticles, the calcination reagent can promote reactions that form covalent bonds between the nanoparticles.

The calcination conditions can be compatible with plastic materials which have low heat distortion temperatures (i.e., below 200° C.). Some such plastics include, for example, polyethylene terephthalate (PET), polycarbonate (PC), and polyimides. Hydrothermal calcination can include an exposure to steam at a temperature of 100° C. to 150° C. (e.g., 120° C.) at a pressure of 10 psi to 30 psi (e.g., 20 psi) for 0.5 hours to 8 hours. The calcination can be carried out in an autoclave. The hydrothermal calcination process can result in a coating that is hydrophilic but not superhydrophilic; as such the coating can lose its anti-fogging properties upon calcination. The anti-fogging properties can be restored by a simple UV treatment, suggesting that the surface was becoming contaminated during calcination. Under certain calcination conditions, the coating retains its superhydrophilicity.

The use of superheated steam, in particular for hydrothermal sintering of silica gels, is known. Hydrothermal treatments have been applied extensively to catalysts and sol-gel processes to obtain reaction media suitable for density-tunable structure syntheses and chemical surface modifications. See, for example, U.S. Pat. Nos. 2,739,075, 2,728,740, 2,914,486, and 5,821,186, and EP 0 137 289, each of which is incorporated by reference in its entirety.

FIG. 1 shows coated article 10 including substrate 20 and coating 25 on a surface of substrate 20. Coating 25 includes nanoparticles 30 and 40. Nanoparticles 30 and 40 can have opposite electrostatic charges. Nanoparticles 30 and 40 can also have different compositions and different average sizes. For example, nanoparticles 30 can be substantially a titanium oxide, while nanoparticles 40 can be substantially a silicon oxide. Nanoparticles 30 and 40 can be arranged in coating 25 so as to create voids 50 among nanoparticles 30 and 40. In some embodiments, coating 25 includes an organic polymer (e.g., a polyelectrolyte organic polymer such as PAA, PAH, or SPS). In other embodiments, coating 25 is substantially free of an organic polymer.

Nanoparticle-based coatings, including coatings that are substantially free of organic polymers, can be self-cleaning. An organic contaminant can be removed or oxidized by the coating, e.g., upon exposure to an activation light source. The activation light source can be a UV light source or a visible light source.

The coatings can be made by a layer-by-layer deposition process, in which a substrate is contacted sequentially with oppositely charge polyelectrolytes. The polyelectrolytes can be in an aqueous solution. The substrate can be contacted with the aqueous solution by, for example, immersion, printing, spin coating, spraying, mist deposition, or other methods.

The polyelectrolyte solutions can be applied in a single step, in which a mixed polymer and nanoparticle solution is applied to a substrate in a controlled manner to achieve required nano-porosity inside the coating. This approach can provide low fabrication cost and high yield. Alternatively, the polyelectrolyte solutions can be applied in a multi-step method, in which polymer layers and nano-particle layers are deposited in an alternating fashion. The multi-step approach can be more efficient for manufacturing with a spray method than an immersion-based method, because spray deposition does not require a rinse between immersions. With either method, the coating parameters such as material composition, solution concentration, solvent type, and so on, can be optimized to efficiently produce a coating with desired properties.

EXAMPLES

Figure 2A:
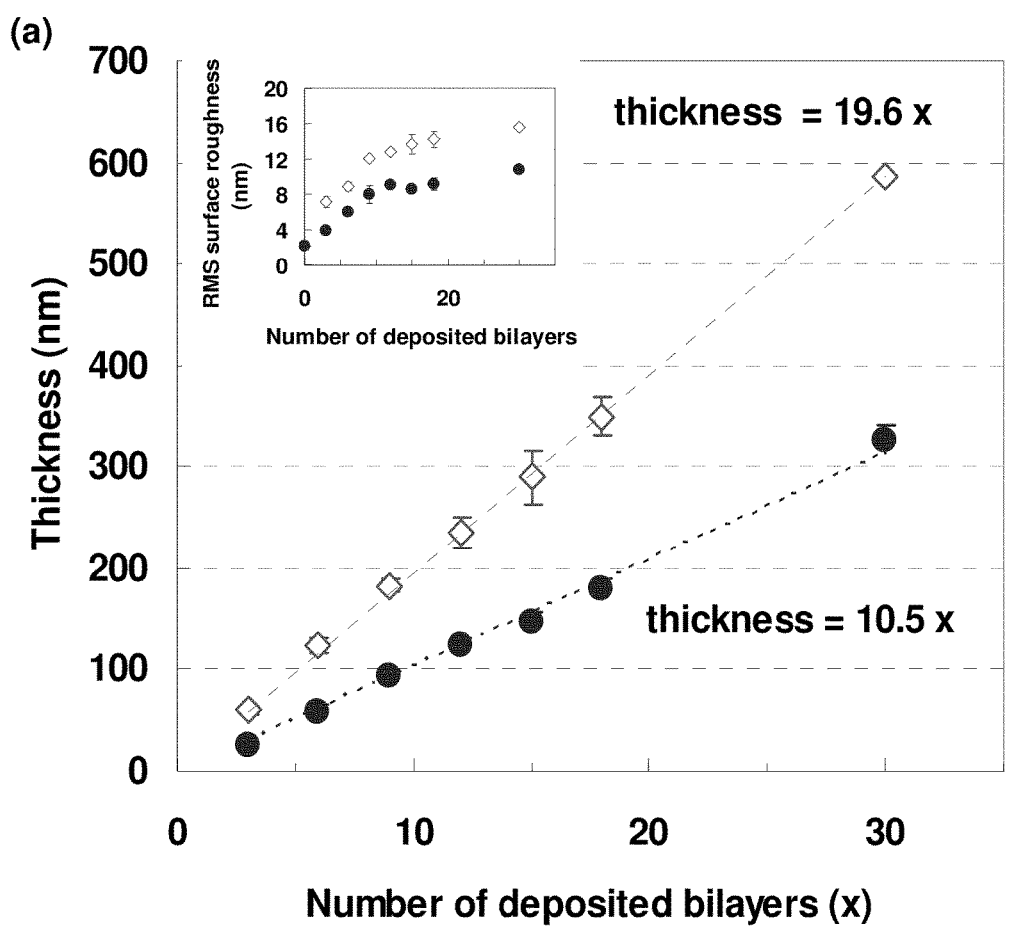
FIGS. 2A-B are graphs illustrating properties of superhydrophilic coatings.

An all-nanoparticle multilayer of positively charged $TiO_2$ nanoparticles (average size ~7 nm) and negatively charged $SiO_2$ nanoparticles (average size ~7 and ~22 nm) was prepared by layer-by-layer assembly using glass or silicon as the substrate. Each nanoparticle suspension had a concentration of 0.03 wt. % and a pH of 3.0. The growth behavior of multilayers made of $TiO_2$ and $SiO_2$ nanoparticles was monitored using spectroscopic ellipsometry and atomic force microscopy (AFM). FIG. 2A shows the variation of film thickness with increasing number of deposited bilayers (one bilayer consists of a sequential pair of $TiO_2$ and $SiO_2$ nanoparticle depositions). In both cases, the multilayers show linear growth behavior (average bilayer thickness for 7 nm $TiO_2$/22 nm $SiO_2$ and 7 nm $TiO_2$/7 nm $SiO_2$ multilayers is 19.6 and 10.5 nm, respectively). The RMS surface roughness, determined via AFM, increased asymptotically in each case. Other studies, in which nanoparticle thin films were assembled using polyelectrolytes, DNA or di-thiol compounds as linkers between nanoparticles also showed linear growth behavior. See, for example, Ostrander, J. W., Mamedov, A. A., Kotov, N. A., *J. Am. Chem. Soc.* 2001, 123, 1101-1110; Lvov, Y.; Ariga, K.; Onda, M.; Ichinose, I.; Kunitake, T. *Langmuir* 1997, 13, 6195-6203; Brust, M.; Bethell, D.; Kiely, C. J.; Schiffrin, D. J. *Langmuir* 1998, 14, 5425-5429; Taton, T. A.; Mucic, R. C.; Mirkin, C. A.; Letsinger, R. L. *J. Am. Chem. Soc.* 2000, 122, 6305-6306; and Cebeci, F. C.; Wu, Z. Z.; Zhai, L.; Cohen, R. E.; Rubner, M. F. *Langmuir* 2006, 22, 2856-2862, each of which is incorporated by reference in its entirety. However, in a recent molecular dynamics (MD) simulation study of layer-by-layer assembled multilayers comprising two oppositely charged nanoparticles, the thickness of the multilayers exhibited non-linear growth behavior due to the increase in the surface roughness of the multilayers (Jeon, J.; Panchagnula, V.; Pan, J.; Dobrynin, A. V. *Langmuir* 2006, 22, 4629-4637, which is incorporated by reference in its entirety). The increased surface roughness was a result of substrates not being uniformly coated with the nanoparticles as the number of deposited layers increased. Therefore, the observed saturation of surface roughness here indirectly indicates that the surface was uniformly and completely coated with the nanoparticle multilayers. AFM results (not shown) confirmed the existence of a uniform coating of multilayers on glass substrates.

Figure 2B:
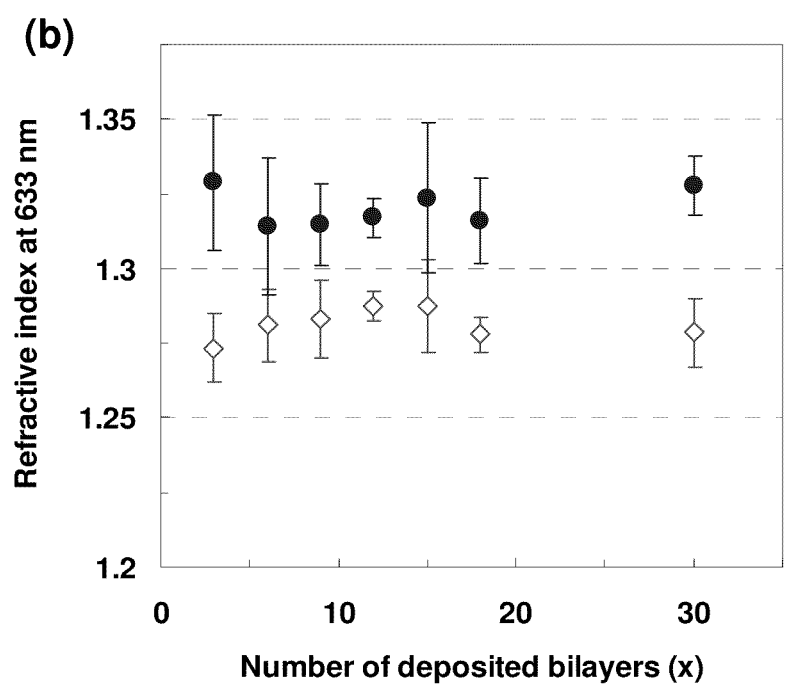

While the refractive index of each system does not change as a function of the number of deposited bilayers, the refractive indices of the two systems differ. FIG. 2B shows that multilayers of 7 nm $TiO_2$ and 22 nm $SiO_2$ nanoparticles had an average refractive index of 1.28±0.01, whereas multilayers made from 7 nm $TiO_2$ and 7 nm $SiO_2$ nanoparticles had an average refractive index of 1.32±0.01. In both cases, the refractive index of the $TiO_2/SiO_2$ nanoparticle multilayer was lower than the reported values of bulk anatase $TiO_2$ (2.0~2.7) and $SiO_2$ (1.4~1.5) (see Klar, T.; et al., *Phys. Rev. Lett.* 1998, 80, 4249-4252; Wang, X. R.; et al., *Appl. Phys. Lett.* 1998, 72, 3264-3266; Biswas, R.; et al., *Phys. Rev. B* 2000, 61, 4549-4553; and Garcia-Santamaria, F.; et al., *Langmuir* 2002, 18, 1942-1944, each of which is incorporated by reference in its entirety). The assembly of nanoparticles results in the presence of nanopores which effectively lower the refractive index of the multilayers. The invariance of the refractive index with thickness and the linear growth behavior indicate that the composition of the multilayers for each system did not vary with increasing number of deposited bilayers. The difference in the observed refractive index of the two multilayer systems suggests that either the porosity, the relative amount of $TiO_2$ to $SiO_2$ nanoparticles, or both, differed. To clearly address this issue, the porosity and chemical composition of the nanoparticle multilayer coatings was determined via ellipsometry.

Ellipsometry has been widely used to estimate the porosity of thin films based on the assumption that the refractive index of the constituent materials is known. See, for example, Cebeci, F. C.; et al., *Langmuir* 2006, 22, 2856-2862; and Tzitzinou, A.; et al., *Macromolecules* 2000, 33, 2695-2708, each of which is incorporated by reference in its entirety. When the constituent materials are nanoparticles, however, it is not always possible to have reliable information on the refractive index of the nanoparticles utilized to fabricate the film. The physical properties of nanoparticles differ from the bulk properties of their corresponding materials due to quantum confinement effects and their large specific surface areas (Henglein, A. *Chem. Rev.* 1989, 89, 1861-1873; and Alivisatos, A. P. *Science* 1996, 271, 933-937, each of which is incorporated by reference in its entirety).

A method based on ellipsometry to determine the porosity of nanoporous thin films without any assumption about the material properties (i.e., refractive index) was developed. For porous thin films, if the refractive index of the material's framework (i.e., solid materials) and the overall porosity are unknown, the solving of two independent equations containing the two parameters would be necessary to determine these values. These two independent equations can be obtained by measuring the values of the effective refractive index of the porous thin films in two different media of known refractive index (e.g., air and water), assuming that the thickness of the porous thin films remain constant in these two different media (constant volume). Another prerequisite for this method is that the pores should be interconnected so that the chosen media can infiltrate and fill the pores completely. Based on the arguments above, the porosity and the refractive index of the film's solid framework can be expressed as follows:

$$p = \frac{n_{f,2} - n_{f,1}}{n_{f,water} - n_{f,air}} = \frac{n_{f,2} - n_{f,1}}{0.33} \quad (1)$$

$$n_{f,framework} = \frac{n_{f,1} - n_{f,air} \cdot p}{1 - p} \quad (2)$$

where p represents the porosity (or the fraction of void volume) of the porous thin films, and $n_{f,air}$(=1.00), $n_{f,water}$ (=1.33), and $n_{f,framework}$ represent the refractive index of air, water and the solid framework, respectively. $n_{f,1}$ and $n_{f,2}$ represent the experimentally measured effective refractive index of the porous thin films in media 1 (in air) and 2 (in water), respectively (the term "effective refractive index" ($n_{f,1 \ and \ 2}$) refers to the refractive index of the entire porous thin film experimentally measured via ellipsometry. On the other hand, the refractive index of the solid framework ($n_{f,framework}$) refers to the refractive index of the solid materials in the porous films). Equations (1) and (2) allowed the determination of the porosity of the thin film and the refractive index of the nanoparticle framework with simple ellipsometric measurements in two different media. As long as the solvent used (water was used in this study) fills the pores but does not swell the structure, this methodology can be used to characterize any nanoporous thin film, allowing facile determination of the porosity and refractive index of framework materials with an ellipsometer and a liquid cell. Also, by making thin films comprising only one type of nanoparticle, this method allowed the determination of the refractive index of the constituent nanoparticle.

In the case of the all-nanoparticle thin films made from $TiO_2$ and $SiO_2$, four independent variables need to be determined for quantitative characterization of the films. These variables are porosity (p), the volume fraction of either of the nanoparticles (e.g., $v_{TiO_2}$), and the refractive indices of $TiO_2$ ($n_{f,TiO_2}$) and $SiO_2$ ($n_{f,SiO_2}$) nanoparticles. The refractive index of each nanoparticle ($n_{f,TiO_2}$ and $n_{f,SiO_2}$) was first obtained by the method described above; that is, effective refractive indices of nanoporous thin films comprising either $TiO_2$ or $SiO_2$ nanoparticles were measured in air and in water, and then equations (1) and (2) were used to calculate the refractive index of each constituent nanoparticle. For this purpose, nanoporous thin films comprising either all-$TiO_2$ or all-$SiO_2$ nanoparticles were prepared by the layer-by-layer assembly of $TiO_2$ nanoparticle/poly(vinyl sulfonate) (PVS) or poly(diallyldimethylammonium chloride) (PDAC)/$SiO_2$ nanoparticle multilayers, respectively. To prevent swelling of these multilayers, the polymers in each multilayer were subsequently removed and the constituent nanoparticles were partially fused together by high temperature calcination before ellipsometric measurements were performed in air and in water. The calcinated films did not undergo any swelling in water. The refractive indices of 7 nm $TiO_2$, 7 nm $SiO_2$ and 22 nm $SiO_2$ nanoparticles were determined to be 2.21±0.05, 1.47 ±0.01 and 1.47±0.004, respectively. The porosity (p) and the refractive index of the composite framework ($n_{f,framework}$; the term "composite" is used as the material's framework in this case since it consists of $TiO_2$ and $SiO_2$ nanoparticles) of the $TiO_2$/$SiO_2$ nanoparticle-based films were determined by measuring the effective refractive index of these $TiO_2$/$SiO_2$ nanoparticle-based films in air and in water, and using equations (1) and (2). These all-nanoparticle thin films were also calcinated (as will be described below) to prevent swelling of the films in water. Using the values obtained for $n_{f,TiO_2}$, $n_{f,framework}$ and p, the volume fraction of $TiO_2$ and $SiO_2$ nanoparticles can be calculated using the linear relation for composite refractive indices and is expressed as shown in the following equations:

$$v_{TiO_2} = \frac{n_{f,framwork} - n_{f,SiO_2}}{n_{f,TiO_2} - n_{f,SiO_2}} \cdot (1-p) \quad (3)$$

$$v_{SiO_2} = 1 - (p + v_{TiO_2}) \quad (4)$$

The values obtained are summarized in Table 1. The major difference between the 7 nm $TiO_2$/22 nm $SiO_2$ and 7 nm $TiO_2$/7 nm $SiO_2$ nanoparticle-based multilayer coatings was the porosity, consistent with a denser packing of nanoparticles in films with 7 nm $TiO_2$ and 7 nm $SiO_2$ nanoparticles compared to films with the 22 nm $SiO_2$ nanoparticles. The weight fraction of $TiO_2$ in the two systems did not differ significantly, although the 7 nm $TiO_2$/7 nm $SiO_2$ system had a slightly larger value. Table 1 also shows that the ellipsometry method was sensitive enough to distinguish the slight difference in chemical composition of multilayers with a half bilayer difference (e.g., between 6 and 6.5 bilayers of 7 nm $TiO_2$ and 22 nm $SiO_2$ multilayers).

TABLE 1

Porosity and chemical composition of calcinated $TiO_2$/$SiO_2$ multilayers as determined by in-situ ellipsometric method.

| Multilayers | Number of bilayers | Composition vol. % (wt. %) | | |
|---|---|---|---|---|
| | | Air | $TiO_2$[a] | $SiO_2$[b] |
| (7 nm $TiO_2$/22 nm $SiO_2$) | 6 | 44.7 (0) | 1.2 (6.3) | 54.1 (93.7) |
| | 6.5 | 45.3 (0) | 1.6 (8.0) | 53.1 (92.0) |
| (7 nm $TiO_2$/7 nm $SiO_2$) | 12 | 35.4 (0) | 1.6 (7.3) | 63.0 (92.7) |
| | 12.5 | 35.8 (0) | 1.7 (8.0) | 62.5 (92.0) |

[a]density of $TiO_2$ = 3.9 g/cm$^3$,
[b]density of 22 nm and 7 nm $SiO_2$ = 1.3 and 1.22 g/cm$^3$ (provided by the supplier), respectively.

To confirm the reliability of the chemical composition determined via ellipsometry, the weight fractions of $TiO_2$ and $SiO_2$ nanoparticles were determined independently using a quartz crystal microbalance (QCM) and X-ray photoelectron spectroscopy (XPS). Table 2 summarizes the chemical composition (wt. % of $TiO_2$ nanoparticles) determined via QCM and XPS. The weight fractions of $TiO_2$ obtained from QCM and XPS consistently indicated that the amount of $TiO_2$ nanoparticles in the multilayers was relatively small (<12 wt. %) and that the 7 nm $TiO_2$/7 nm $SiO_2$ multilayers had a slightly larger amount of $TiO_2$ nanoparticles present in the films. These results were consistent with the results obtained from ellipsometry which showed that the weight fraction of $TiO_2$ nanoparticles in both systems was relatively small compared to that of the $SiO_2$ nanoparticles and that the 7 nm $TiO_2$/7 nm $SiO_2$ system had a higher content of $TiO_2$ nanoparticles. The fact that the values obtained from three different techniques showed good agreement validated the capability of the ellipsometry method.

TABLE 2

Weight percentage (wt. %) of $TiO_2$ nanoparticles in $TiO_2$/$SiO_2$ nanoparticle thin films as determined by QCM and XPS.

| Multilayers | QCM | XPS[a] |
|---|---|---|
| (7 nm $TiO_2$/22 nm $SiO_2$) | 8.1 ± 2.3 | 2.9~6.6 |
| (7 nm $TiO_2$/7 nm $SiO_2$) | 11.6 ± 1.7 | 5.8~10.9 |

[a]The lower and upper limit of the values for $TiO_2$ wt. % were obtained by analyzing the multilayers with $SiO_2$ and $TiO_2$ nanoparticles as the outermost layer, respectively.

The observation that the volume fraction of $TiO_2$ nanoparticles in the two multilayer systems studied was below 2 vol. % (less than 8 wt. %) was remarkable and surprising. The surface charge density of each nanoparticle during the LbL assembly can play an important role in determining the chemical composition of the $TiO_2$/$SiO_2$ nanoparticle-based multilayer thin films. At the assembly conditions, which was pH 3.0 for both nanoparticle suspensions, the zeta-potential of the 7 nm $TiO_2$ nanoparticles was +40.9±0.9 mV, compared to values of −3.3±2.6 and −13.4±1.4 mV, for the 7 nm and 22 nm $SiO_2$ nanoparticles respectively. These values suggest that the $TiO_2$ nanoparticles were much more highly charged than the $SiO_2$ nanoparticles during the LbL assembly. Therefore, only a small number of $TiO_2$ nanoparticles would be required to achieve the charge reversal required for multilayer growth. Also the interparticle distance between adsorbed $TiO_2$ nanoparticles would be large due to strong electrostatic repulsion between the particles. On the other hand, a large number of $SiO_2$ nanoparticles would be needed to reverse the surface charge and, at the same time, $SiO_2$ nanoparticles can pack more densely compared to $TiO_2$ nanoparticles as the electrostatic repulsion between the $SiO_2$ nanoparticles was not as great as that between highly charged $TiO_2$ nanoparticles. On a similar note, Lvov et al. have also shown that the partial neutralization of functional groups on $SiO_2$ nanoparticles by addition of salt to a nanoparticle suspension leads to an increased fraction of $SiO_2$ nanoparticles in multilayers assembled with a polycation (Lvov, Y.; et al., Langmuir 1997, 13, 6195-6203, which is incorporated by reference in its entirety).

Figure 3A:
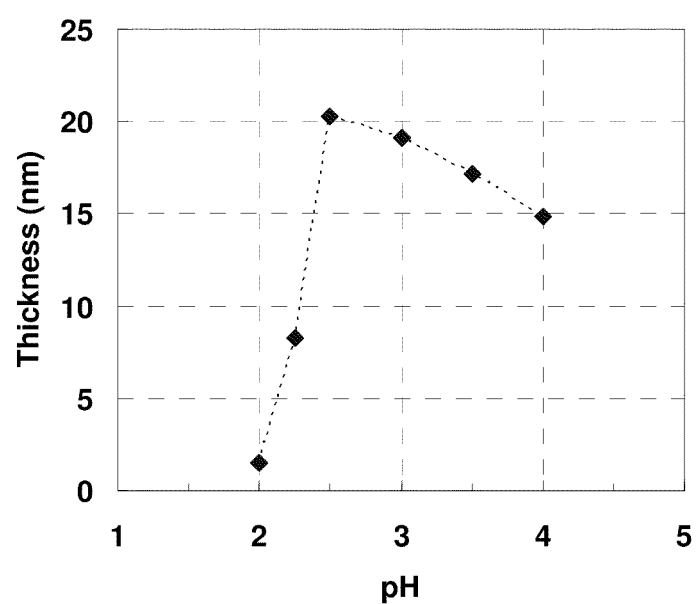
FIGS. 3A-D are graphs illustrating the effect of pH on nanoparticle properties.
Figure 3B:
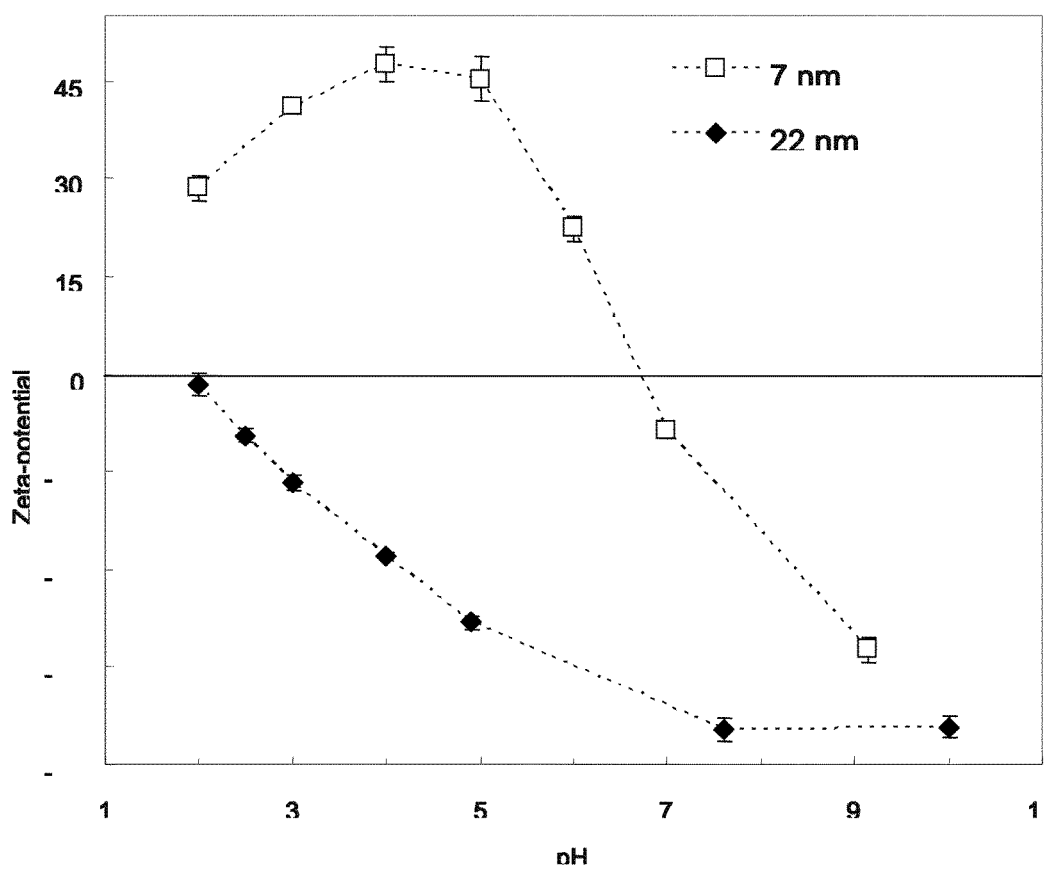
Figure 3C:
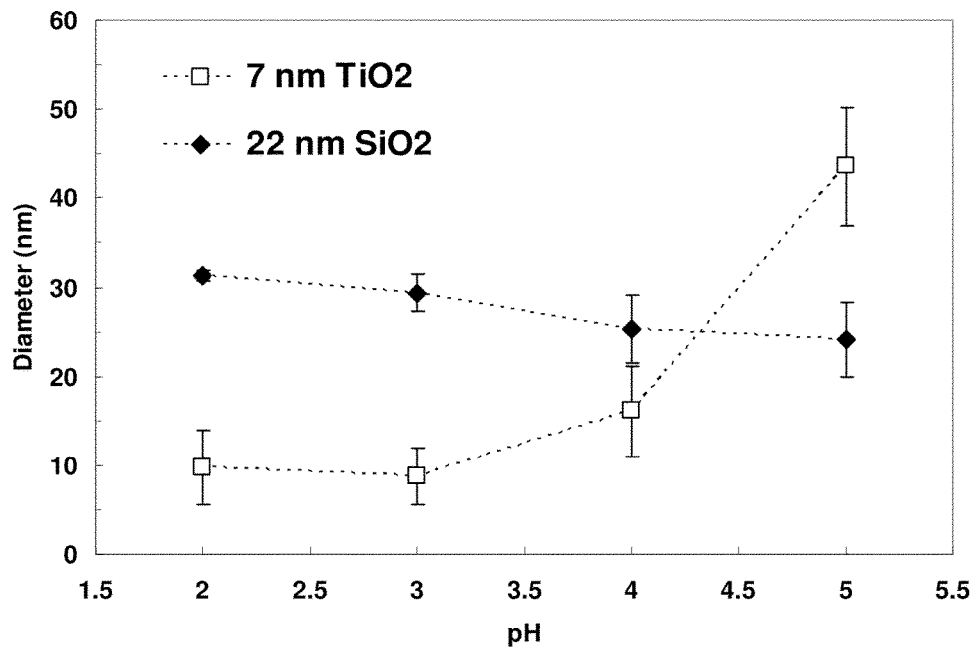
Figure 3D:
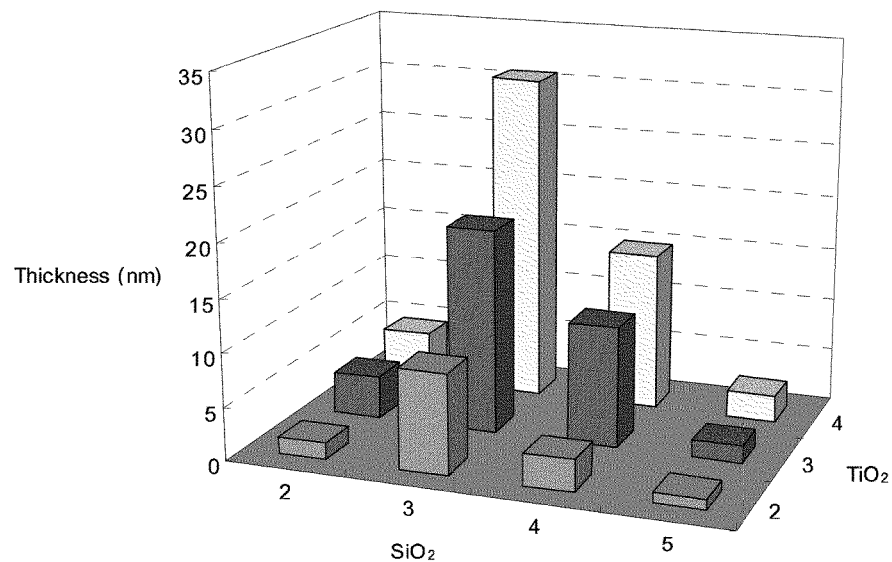

FIGS. 3A-3D show the effects of pH on nanoparticle film assembly. FIG. 3A shows average bilayer thickness as a function of nanoparticle solution pH (both solutions were at the same pH). FIG. 3B shows the measured zeta-potential of 7 nm $TiO_2$ and 22 nm $SiO_2$ nanoparticles as a function of pH. FIG. 3C shows the measured particle sizes as a function of pH. FIG. 3D shows the effect of pH of each nanoparticle solution on average bilayer thickness. These data can be used to select assembly conditions to control coating properties (e.g., final coating thickness).

Figure 4:
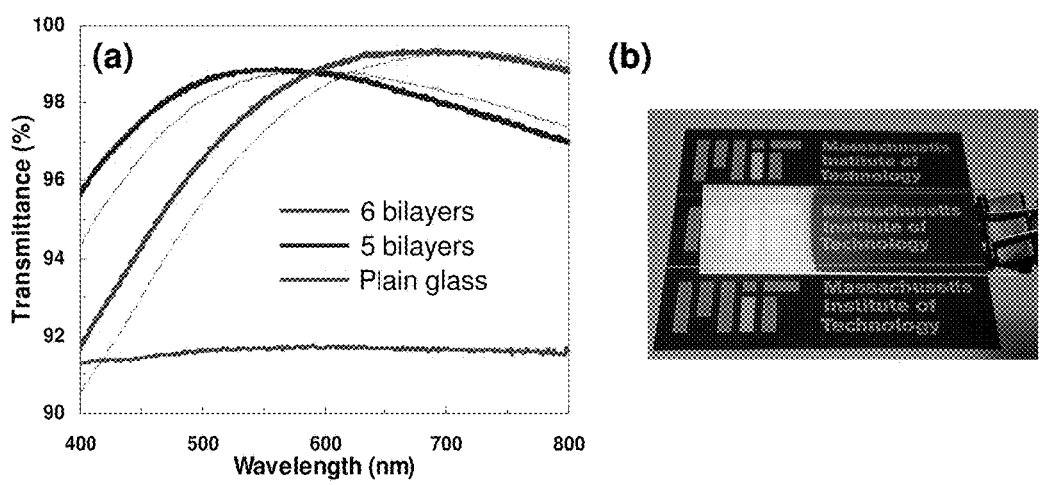
FIGS. 4A-B illustrate anti-reflective properties of a superhydrophilic coating.

Depositing the nanoporous $TiO_2/SiO_2$ nanoparticle-based coatings on glass caused the reflective losses in the visible region to be significantly reduced, and transmission levels above 99% were be readily achieved. The wavelength of maximum suppression of reflections in the visible region was determined by the quarter-wave optical thickness of the coatings, which can be varied by changing the number of layers deposited as seen in FIG. 4A. FIG. 4A shows transmittance spectra of 7 nm $TiO_2$/22 nm $SiO_2$ multilayer coatings before (thin solid line) and after calcination at 550° C. (thick solid line) on glass substrates. Green, Red and Blue curves represent transmittance through untreated glass and glass coated with 5- and 6 bilayers, respectively. FIG. 4B reveals the visual impact of these all-nanoparticle antireflection coatings. FIG. 4B is a photograph of a glass slide showing the suppression of reflection by a 5 bilayer 7 nm $TiO_2$/22 nm $SiO_2$ nanoparticle multilayer (calcinated). The left portion of the slide was not coated with the multilayers. Multilayer coatings are on both sides of the glass substrates. Due to its higher effective refractive index, the antireflection properties of a multilayer coating made from 7 nm $TiO_2$ and 7 nm $SiO_2$ nanoparticles (not shown) were not as pronounced (ca. 98 and 97% maximum transmission in the visible region before and after calcination, respectively) as the 7 nm $TiO_2$ and 22 nm $SiO_2$ nanoparticle-based multilayer coatings. The wavelength of maximum suppression of the 7 nm $TiO_2$/7 nm $SiO_2$ nanoparticle system, however, can be tuned more precisely compared to the 7 nm $TiO_2$/22 nm $SiO_2$ multilayers as the average bilayer thickness is only 10 nm.

For practical application of any coating, the mechanical integrity (durability and adhesion) can be extremely important. As-assembled $TiO_2/SiO_2$ nanoparticle-based multilayers show less than ideal mechanical properties. The poor adhesion and durability of the as-assembled multilayer films was likely due to the absence of any interpenetrating components (i.e., charged macromolecules) that bridge or glue the deposited particles together within the multilayers. The mechanical properties of the all-nanoparticle multilayers were improved significantly by calcinating the as-assembled multilayers at a high temperature (550° C.) for 3 h. As described briefly above, this process led to the partial fusing of the nanoparticles together. Better adhesion of the coatings to glass substrates was also achieved (see Cebeci, F. C.; et al., Langmuir 2006, 22, 2856-2862, which is incorporated by reference in its entirety). While the film thickness decreased by ca. 5%, the refractive index increased slightly (ca. 2%) after the calcination process, resulting in the observed blue shift in the maximum transmission wavelength as seen in FIG. 4A. From this point on, the multifunctional properties of calcinated (7 nm $TiO_2$/22 nm $SiO_2$) multilayers will be reported.

Figure 5A:
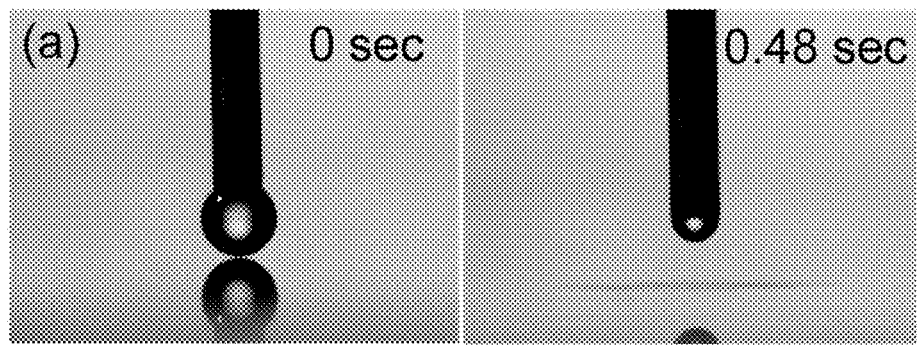
FIGS. 5A-C illustrate properties of superhydrophilic surfaces.
Figure 5B:
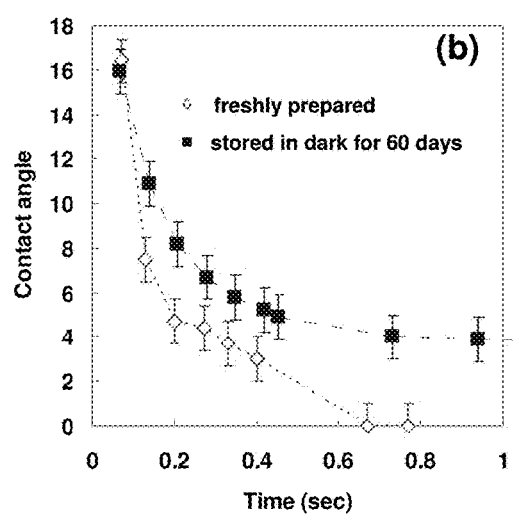

In addition to antireflection properties, the nanoporosity of $TiO_2/SiO_2$ nanoparticle multilayers led to superhydrophilicity. Nanoporous coatings include $SiO_2$ nanoparticles exhibit superhydrophilicity (water droplet contact angle <5° in less than 0.5 sec) due to the nanowicking of water into the network of capillaries present in the coatings (see U.S. patent application Ser. No. 11/268,547, and Cebeci, F. C.; et al., Langmuir 2006, 22, 2856-2862, each of which is incorporated by reference in its entirety). The mechanism of such behavior can be understood from the simple relation derived by Wenzel and co-workers. It is well established that the apparent contact angle of a liquid on a surface depends on the roughness of the surface according to the following relation:

$$\cos \theta_a = r \cos \theta \qquad (5)$$

where $\theta_a$ is the apparent water contact angle on a rough surface and $\theta$ is the intrinsic contact angle as measured on a smooth surface. r is the surface roughness defined as the ratio of the actual surface area over the project surface area. r becomes infinite for porous materials meaning that the surface will be completely wetted (i.e., $\theta_a \sim 0$) with any liquid that has a contact angle (as measured on a smooth surface) of less than 90°. The contact angle of water on a planar $SiO_2$ and $TiO_2$ surface is reported to be approximately 20° and 50~70°, respectively; therefore, multilayers comprised of $SiO_2$ nanoparticles (majority component) and $TiO_2$ nanoparticles (minority component) with nanoporous structures should exhibit superhydrophilicity. FIGS. 5A-B verified this expectation; the data show that the contact angle of a water droplet (~0.5 μL) on $TiO_2/SiO_2$ nanoparticle-based multilayer coatings became less than 5° in less than 0.5 sec.

Unlike $TiO_2$-based coatings which lose their superhydrophilicity in the dark, $SiO_2/TiO_2$ nanoparticle-based coatings retained the superhydrophilicity even after being stored in dark for months at a time. This can be because the superhydrophilicity is enabled by the nanoporous structure rather than the chemistry of $TiO_2$. FIG. 5B shows that superhydrophilicity remained after 60 days of storage in the dark.

Figure 5C:
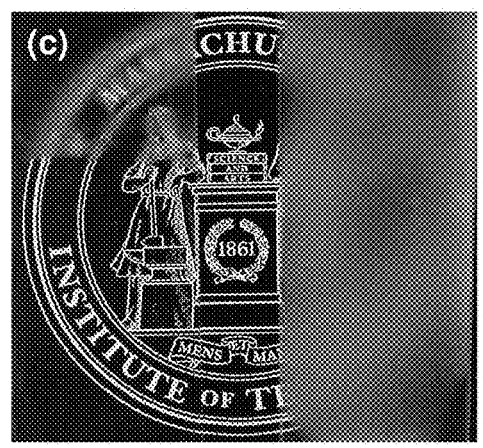

The anti-fogging properties of these coatings were demonstrated by exposing untreated and multilayer-modified glass substrates to humid environments (relative humidity ~50%) after cooling them at a low temperature (4° C.) as seen in FIG. 5C. FIG. 5C is a photograph demonstrating the anti-fogging properties of multilayer coated glass (left) compared to that of an untreated glass substrate (right). Each sample was exposed to air (relative humidity ~50%) after being cooled in a refrigerator (4° C.) for 12 h. The top portion of the slide on the left had not been coated with the multilayer. Although ordinary (i.e., solid) $TiO_2$ based coatings can be rendered superhydrophilic and anti-fogging by UV irradiation, such coatings lose their anti-fogging properties after storage in dark. The $TiO_2/SiO_2$ nanoparticle based multilayers retained their anti-fogging properties even after being stored in dark over 6 months. As described above, the presence of nanopores in these films leads to nanowicking of water into the network of capillaries in the coatings; therefore, the superhydrophilicity of these coatings can be observed even in the absence of UV irradiation.

Figure 6:
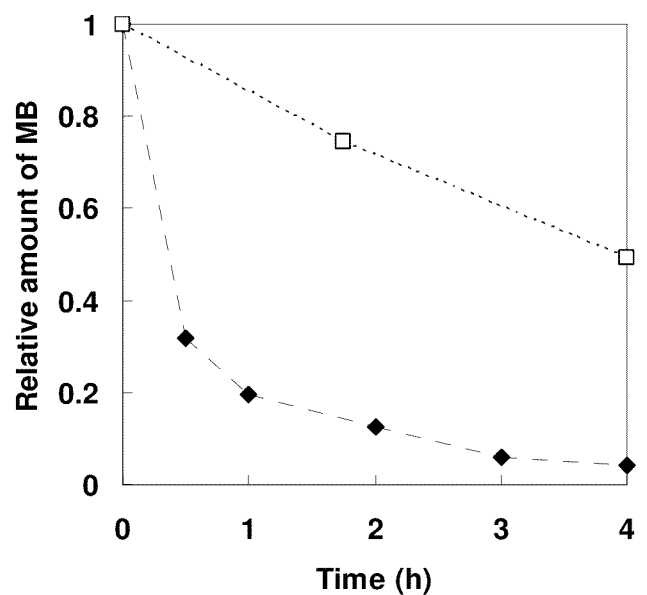
FIG. 6 is a graph depicting self-cleaning behavior of a superhydrophilic coating.

Contamination of the porous matrix by organic compounds can lead to the loss of anti-fogging properties. In this respect, a self-cleaning an anti-fogging coating can be desirable, to promote long-term performance of the anti-fogging coating. The self-cleaning properties of $TiO_2/SiO_2$ nanoparticle-based multilayers was tested to confirm that organic contaminants can be removed or oxidized under UV irradiation. Glass substrates coated with $TiO_2/SiO_2$ nanoparticle-based multilayers and $SiO_2$ nanoparticle-based superhydrophilic coatings were contaminated using a model contaminant, i.e., methylene blue (MB). The decomposition of methylene blue by the coatings was monitored by measuring the amount of remaining MB in the coatings after UV irradiation as a function of time. FIG. 6 shows that essentially more than 90% of the MB in the $TiO_2/SiO_2$ nanoparticle-based coatings (diamonds) was decomposed after 3 h of UV irradiation. In a coating with only $SiO_2$ nanoparticles (squares), more than 60% of the MB remained in the coating after 4 h. The contact angle of water on the MB-contaminated surface was 20.0±1.2° and changed to ~3° after 2 h of UV irradiation indicating that the superhydrophilicity was also recovered. These results demonstrate that the amount of $TiO_2$ nanoparticles in the multilayer coatings (slightly more than 1 volume %) was sufficient to confer self-cleaning properties to these coatings. The recovered anti-fogging property was retained for more than 30 days even after storing the UV illuminated samples in dark.

The contact angle of water on the MB contaminated $TiO_2/SiO_2$ surface was 18.5±1.0°; thus, the antifogging properties were lost. The contact angle changed to ~0° after 2 h of UV irradiation indicating that the superhydrophilicity was recovered. These results demonstrated that the amount of $TiO_2$ nanoparticles in the multilayer coatings (slightly more than 6 wt. %) was sufficient to confer self-cleaning properties to these coatings. Nakajima et al. also have shown that transparent superhydrophobic coatings containing only 2 wt. % $TiO_2$ can self-clean under the action of UV irradiation (Nakajima, A.; et al., Langmuir 2000, 16, 7044-7047, which is incorporated by reference in its entirety). The recovered antifogging property was retained for more than 30 days even after storing the MB-contaminated/UV illuminated samples in the dark. The contact angle measured on the UV irradiated samples after 30 days of storage in the dark was less than 4°, which is below the limit at which antifogging properties are observed (~7°). Some previous studies have shown that the incorporation of $SiO_2$ into $TiO_2$ based thin films improves the stability of light-induced superhydrophilicity; however, the mechanism behind the improved stability was different from our mechanism, which is driven by the nanoporosity (see, e.g., Zhang, X. T.; et al., Chem. Mater. 2005, 17, 696-700; and Machida, M., et al., J. Mater. Sci. 1999, 34, 2569-2574, each of which is incorporated by reference in its entirety).

While the current system contains $TiO_2$ nanoparticles that require UV irradiation (wavelengths shorter than 400 nm) for activation, $TiO_2$ nanoparticles that are sensitive to visible light have been developed. We believe incorporation of these visible light active $TiO_2$ nanoparticles into the multilayer coatings should be straightforward using the LbL technique and enable self-cleaning properties of the coatings in the visible region.

Figure 7A:
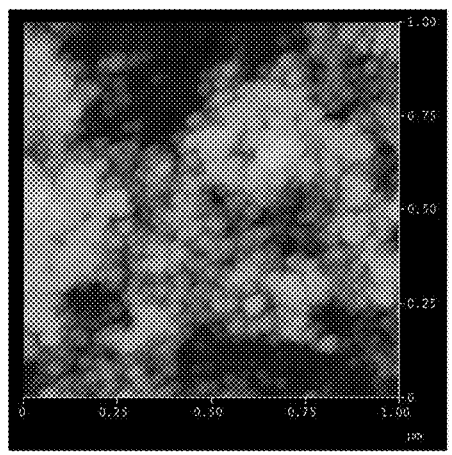
FIGS. 7A-B are atomic force micrographs of nanoparticle coatings.
Figure 7B:
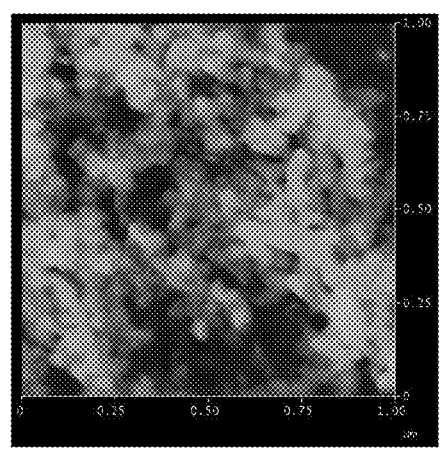

FIGS. 7A-B show atomic force microscopy (AFM) images of pre- (FIG. 7A) and post-treatment (FIG. 7B) silica surfaces. There was extensive bridging between nanoparticles post-treatment.

Figure 8:
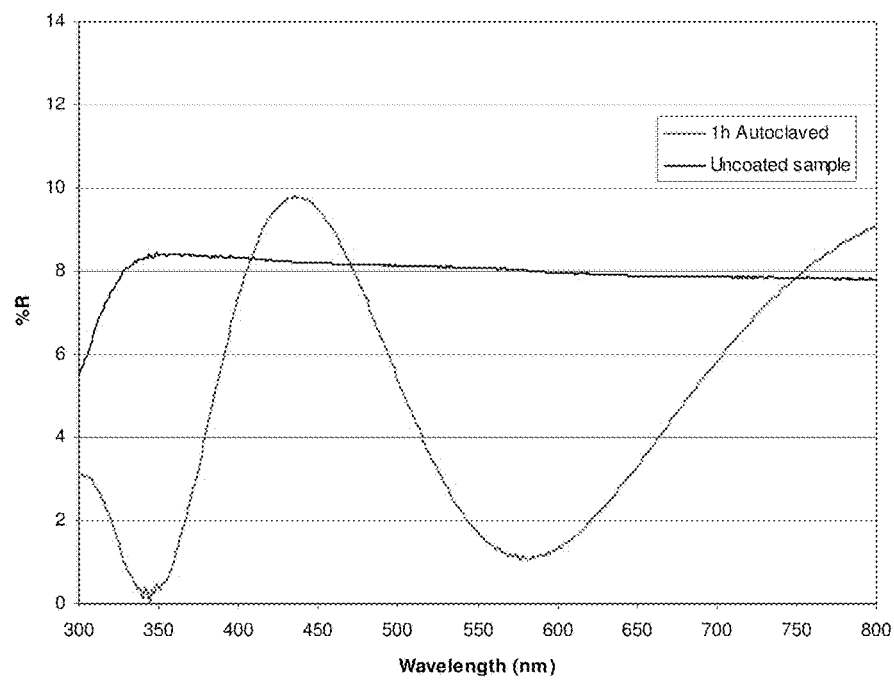
FIG. 8 is a graph illustrating optical properties of coated glass.

FIG. 8 shows reflection spectra of an uncoated glass slide and a hydrothermally stabilized silica-based anti-reflection coating on glass substrate. The uncoated slide reflected approximately 8% of incident light across the visible spectrum; the coated, treated slide had a broad reflectivity window centered at approximately 580 nm, with a minimum reflectance value of less than 2%.

The effect of wiping the anti-reflection coating above with 70% isopropanol is demonstrated in FIGS. 9A-B. The wavelengths at which anti-reflection coatings were functional depended strongly on the thickness of the coatings. Therefore, superimposed transmission curves before and after wiping with isopropanol demonstrate that the coating was not being removed from the substrate upon wiping. Anti-reflection coatings as-prepared (i.e., not calcinated) were removed immediately upon wiping (not shown).

FIG. 10 shows the results of nanoindentation experiments on as-prepared, thermally calcined (550° C.), and hydrothermally treated coatings. The as-prepared film had a nanoindentation modulus of less than 10 GPa, the thermally calcinated film had a nanoindentation modulus of less than 15 GPa, and the hydrothermally treated (i.e., exposed to pressurized steam at 120° C.) film had a nanoindentation modulus of greater than 15 GPa.

Figure 11A:
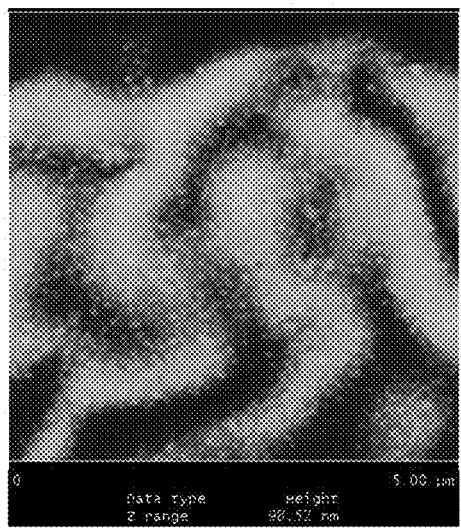
FIGS. 11A-B are atomic force micrographs of nanoparticle coatings.
Figure 11B:
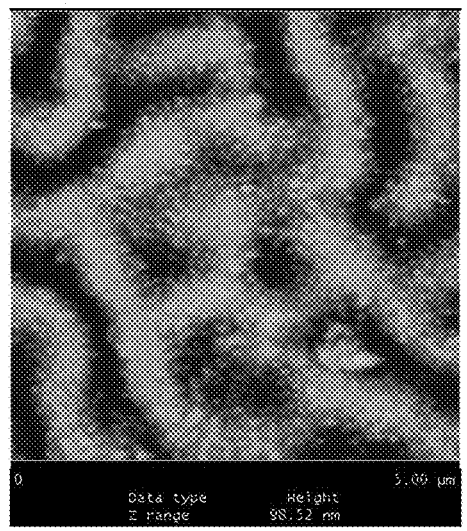

In addition to providing mechanical stability to films, hydrothermal treatments were used to generate surface patterns in a completely self-assembled, bottom-up manner. While such pattern generation necessitates careful selection of coating composition, an example is shown in FIGS. 11A-B, which are atomic force micrographs of hydrothermally treated coatings. Such pattern generation techniques may prove important in mimicking biological pattern formation during biological development (e.g., butterfly wings) in a cheap, reliable, and scalable fashion.

Other embodiments are within the scope of the following claims.

What is claimed is:

1. An article comprising a surface comprising:
    a planar substrate; and
    a hydrothermally calcinated inorganic nanoparticle multilayer coating including;
        a first layer including a first plurality of inorganic nanoparticles having a first electrostatic charge in contact with the substrate; and
        a second layer including an oppositely charged second plurality of inorganic nanoparticles in contact with the first plurality of inorganic nanoparticles;
    wherein the first plurality of inorganic nanoparticles and the second plurality of nanoparticles are fused to each other in the presence of a calcination reagent selected to promote fusing of the first plurality of nanoparticles and the second plurality of nanoparticles,
    wherein the multilayer coating includes only neutrally-charged nanoparticles and free of polyelectrolyte polymers,
    wherein the multilayer coating is adhered to the substrate.

2. The article of claim 1, wherein the surface is antireflective.

3. The article of claim 1, wherein the surface is antifogging.

* * * * *